United States Patent
Kendall et al.

(10) Patent No.: US 8,736,761 B2
(45) Date of Patent: May 27, 2014

(54) SYSTEM AND METHOD FOR CLOSED CAPTIONING

(75) Inventors: Scott Allan Kendall, Lexington, KY (US); Rajeev Madhukar Sahasrabudhe, Maple Grove, MN (US)

(73) Assignee: Thomson Licensing, Boulogne-Billancourt (FR)

( * ) Notice: Subject to any disclaimer, the term of this patent is extended or adjusted under 35 U.S.C. 154(b) by 744 days.

(21) Appl. No.: 12/227,947

(22) PCT Filed: Jun. 9, 2006

(86) PCT No.: PCT/US2006/022492
§ 371 (c)(1),
(2), (4) Date: Dec. 2, 2008

(87) PCT Pub. No.: WO2007/142648
PCT Pub. Date: Dec. 13, 2007

(65) Prior Publication Data
US 2010/0232762 A1      Sep. 16, 2010

(51) Int. Cl.
*H04N 7/00* (2011.01)
*H04N 7/173* (2011.01)
*H04N 9/80* (2006.01)

(52) U.S. Cl.
USPC .............................. 348/473; 725/86; 386/240

(58) Field of Classification Search
USPC .............................. 348/473; 725/86; 386/240
See application file for complete search history.

(56) References Cited

U.S. PATENT DOCUMENTS

| 5,287,181 A * | 2/1994 | Holman ....................... 348/473 |
| 6,198,511 B1 * | 3/2001 | Matz et al. ................... 348/553 |
| 6,208,383 B1 * | 3/2001 | Park ............................. 348/468 |
| 6,256,072 B1 * | 7/2001 | Bae et al. ..................... 348/568 |
| 2004/0044532 A1 * | 3/2004 | Karstens ...................... 704/271 |

FOREIGN PATENT DOCUMENTS

| JP | 11-353859 | 12/1999 |
| JP | 2003-333504 | 11/2003 |
| JP | 2004289277 | 10/2004 |
| JP | 2006-5861 | 1/2006 |
| JP | 2006-66050 | 3/2006 |
| KR | 10-0381989 | 4/2003 |

* cited by examiner

*Primary Examiner* — Ranodhi Serrao
(74) *Attorney, Agent, or Firm* — Robert D. Shedd; Paul P. Kiel

(57) ABSTRACT

An apparatus and method is presented for displaying auxiliary information associated with a multimedia program. Specifically, the present invention is directed to receiving program signals, acquiring auxiliary information (e.g. closed captioning information) from the program signals, associating time information with the auxiliary information, storing the auxiliary information in a file associated with program content, using the auxiliary information file and program content to determine candidate program portions for customization of the auxiliary information, and displaying customized auxiliary information with the program content in accordance with user selections (see FIG. 1). Using the present invention, users with differing abilities and/or preferences related to display of caption text may customize display of the caption information transmitted with television programs.

14 Claims, 5 Drawing Sheets

SYSTEM AND METHOD FOR CLOSED CAPTIONING

This application claims the benefit, under 35 U.S.C. §365 of International Application PCT/US2006/022492 filed Jun. 9, 2006 which was published in accordance with PCT Article 21(2) on Dec. 13, 2007 in English.

FIELD OF THE INVENTION

The present invention relates to an apparatus and method for storing and displaying auxiliary information associated with multimedia programs, and in particular, an apparatus and method for recording caption information (e.g. closed captions) and displaying the captions in a customized manner according to user preferences.

BACKGROUND OF THE INVENTION

Programs transmitted for use with audio-video display devices (e.g. television programming) commonly include textual information embedded in the transmitting signal, known as "closed captioning." Closed captions may be displayed along with video portions of the program to assist those unable or unwilling to make use of the audio portion. For example, closed captions may include a textual transcript of the audio portion of a television program for use by hearing-impaired viewers, viewers in noisy environments, and viewers learning a language.

The display of caption information is largely controlled by parties other than the viewer, such as the broadcaster or program originator. For example, closed captions for most programming are displayed on two or three lines of the display screen, appear on-screen in a predetermined size and for a predetermined duration, and cannot easily be re-displayed once they disappear from the screen.

Because the display parameters are often predetermined, closed captions are usually "one size fits all" and hence may be unsatisfactory for some viewers. Viewers with a slower reading pace, for example, may find that captions appear and disappear more rapidly than desired. In another example, viewers in distracting or "multitasking" environments may desire that captions appear on-screen for a longer duration to permit comprehension even with intermittent viewer attention. In a further example, viewers with poor eyesight may desire that captions appear in a larger text size.

In addition, the "one size fits all" scheme for closed captioning is often unsatisfactory for individual programs or portions of programs. For example, dialogue between characters often occurs in bursts, and when caption information is similarly presented in bursts users may have a difficult time comprehending the dialogue. For another example, users of scientific and educational programming may desire that certain portions of a program be slowed to permit comprehension of complex or critical passages of caption text.

Therefore, there is a need for a system and method of customizing the presentation of caption information according to the desires of individual users. The desired system and method should permit users to determine display parameters such as size and presentation rate, and should permit display of caption text to be customized for particular portions of a program.

SUMMARY OF THE INVENTION

The present invention is directed to an apparatus and method for displaying auxiliary information associated with a multimedia program. Specifically, the method of the present invention is directed to receiving program signals, acquiring auxiliary information (e.g. caption text) associated with the program signals, associating time information with the auxiliary information, storing the auxiliary information in a file associated with program content, using the auxiliary information file and program content to determine candidate program portions for customization of the auxiliary information, and displaying customized auxiliary information with the program content. A user may input one or more preferences relating to display of the auxiliary information, such as number of lines of text, text size, on-screen duration, etc.

In one embodiment, customized display of auxiliary information may include adjusting the display timing relationship between the auxiliary information and the program, including "time spreading" of caption text by starting display of caption text at an earlier time and ending display at a later time. In another embodiment, customized display of auxiliary information may include "area variation" of caption text, including statically or dynamically resizing the on-screen display area in which caption text may appear, varying caption text size or font, varying the number of lines of caption text displayed at one time, varying the amount of time text remains on-screen, etc. In another embodiment, customized display of auxiliary information may include "playback resynchronization," including slightly decreasing or increasing the rate at which caption text and program content is displayed for portions of a program, according to user preferences or user interaction during playback.

In another embodiment, the apparatus of the present invention is directed to a system for displaying customized auxiliary information associated with a multimedia program. Specifically, the system includes a receiver coupled to a source of program signals, a storage device coupled to receive program signals and store auxiliary information in a log file associated with a program, a processor configured to implement instructions for customized presentation of auxiliary information (e.g. caption text), a user input device for inputting preferences or selections of a user, and a display device for displaying customized auxiliary information and program content according to user preferences. In various embodiments, the system includes interfaces for use with a variety of broadcasting and content-delivery mechanisms, volatile and non-volatile storage, one or more input/output buses, encoders and decoders for compressed and/or coded content, controllers for audio/video exhibition devices, and additional processors implementing software and/or firmware instructions. These software and/or firmware instructions may include instructions for displaying customized auxiliary information in a variety of languages, formats, and styles in accordance with processor instructions and/or user preferences.

DETAILED DESCRIPTION

In the following discussion, no particular order is required for the method steps described, with the exception of those logically requiring the results of prior steps, for example storing auxiliary information logically requires the prior acquiring of the auxiliary information. Otherwise, enumerated steps are provided below in an exemplary order which may be altered. For instance, steps such as storing auxiliary information and storing program content may be rearranged or performed simultaneously.

Although the following discussion is provided in the context of television programming, it should be appreciated that the present invention is not so limited and may be applied to a wide variety of multimedia content stored or scheduled to be stored in a multimedia server or other storage system. Likewise, although the system and method of the present invention is discussed with relation to broadcast content (e.g. cable, satellite, and over the air (OTA) television broadcasts), it should be understood that the present invention is not limited to broadcast content, and may be used with content stored on external or internal media or devices, content uploaded, downloaded, or copied from external sources, internally created content, and nearly any other content that may be stored.

Figure 1:
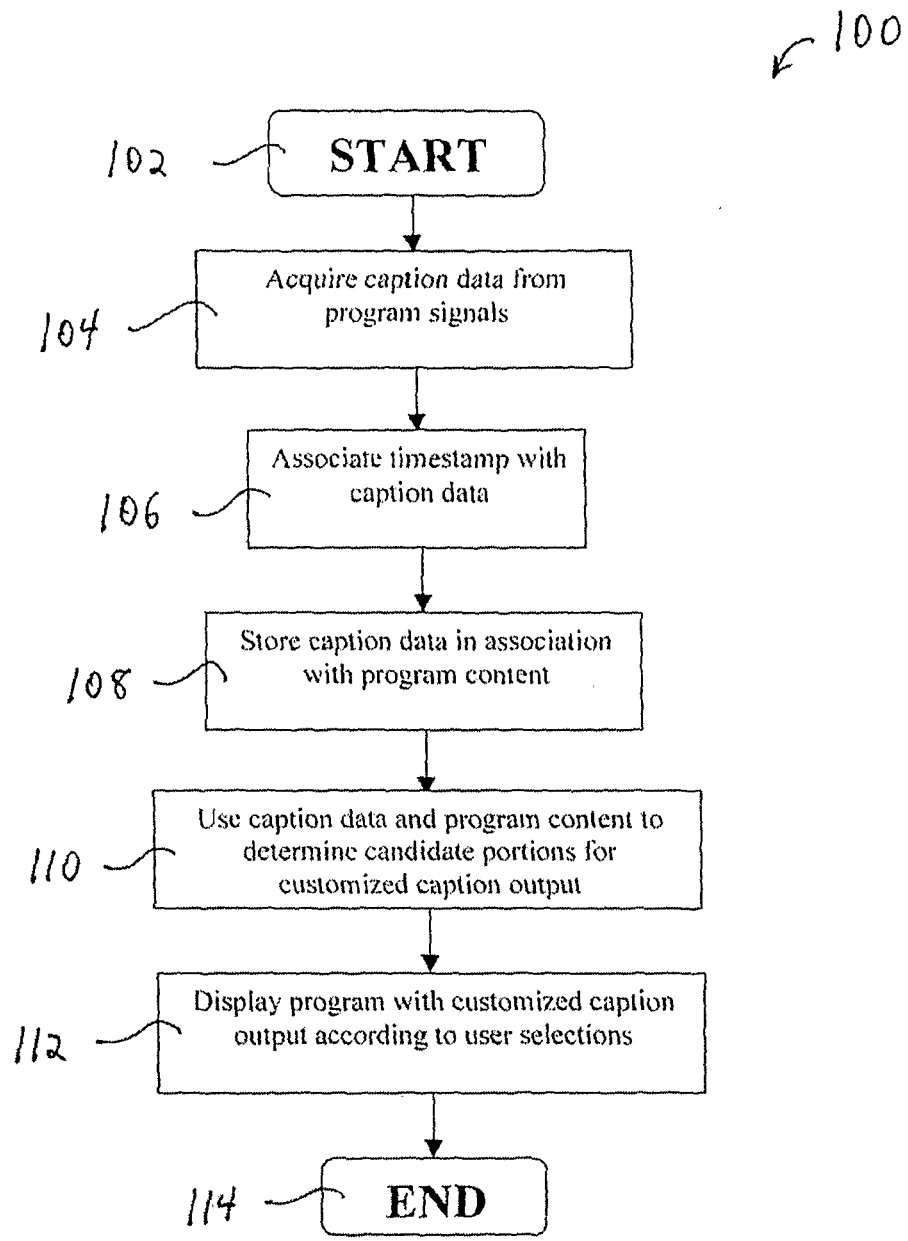
FIG. 1 is a simplified flow diagram illustrating an exemplary method of processing and displaying customized auxiliary information in accordance with an embodiment of the present invention.

To illustrate the particular features and advantages of the invention, an exemplary method in accordance with an aspect of the invention will now be described with reference to FIG. 1. FIG. 1 shows a flow diagram representation of a method of processing and displaying customized auxiliary information generally designated 100. The method 100 includes an acquisition step 104, an association step 106, a storage step 108, a determination step 110, and a display step 112.

The method 100 begins at step 102 and proceeds to the acquisition step 104 in which program signals are received containing embedded auxiliary information, such as closed caption text associated with a television program transmitted via the program signals. The auxiliary information may be acquired from the program signals using a decoder device that operates in conjunction with demodulators for standard television signals, such as the National Television System Committee (NTSC) standard in the United States or the Phase Alternating Line (PAL) standard in Europe.

For example, auxiliary information in the form of closed captioning is commonly contained in the line 21 data area of the vertical blanking interval (VBI) of a television signal. The VBI is the part of a television signal "between frames," that is, the signal portion that follows a previous frame of video but precedes the next frame. The VBI consists of a number of "lines" of information, and in the United States the 21st line may contain two characters of information per frame of video. Each video frame includes two "fields," and each may store caption information including characters, position information, line break commands, etc.

A decoder device may be used to extract the auxiliary information in the form of closed captioning. The decoder device may be contained within a television display device (e.g. television set), or it may be contained in a separate appliance such as a set-top box (STB), personal video recorder (PVR), digital video recorder (DVR), digital video disc (DVD) playback device, or stand-alone closed captioning decoder (CC decoder). It should be appreciated that a variety of other electronic devices, stand-alone or integrated within other devices, may be used to extract the auxiliary information from the program signals without deviating or departing from the spirit and scope of the present invention.

The extracted auxiliary information may include one or more characters of text, such as ASCII text, or may include special characters, symbols, or functions, such as musical notes, highlighting, or color changes. A person of ordinary skill in the art would recognize that a wide variety of data may be included in the auxiliary information in accordance with the present invention, including data communicating spoken words in any language, data conveying audible tones and signals, description of audible or inaudible events, and/or other supplementary information desired to be conveyed or received by the broadcaster, program originator, user, etc.

In the illustrated method 100, the auxiliary information is extracted from the program signals in acquisition step 104 and associated with a timestamp or other sequencing information in association step 106. In order to display auxiliary information in a manner that properly corresponds to program content, it may be necessary to refrain from displaying a succeeding unit of auxiliary information until a given time or until corresponding video information is presented, for example to avoid ruining the element of suspense in a displayed program. To achieve that end, each unit or a group of units of extracted auxiliary information is associated with a timing code (e.g. timestamp) or other information corresponding to VBI time or other program content. In this way, the illustrated method 100 includes extraction from the program signals of the original display time and sequence of each unit of extracted auxiliary information. Of course, the use of a timestamp is optional, and those of skill in the art should understand that other sequence and/or chronological information may be used in the association step 106 in addition to, or instead of, the exemplary timestamp described.

Referring again to FIG. 1, the illustrated method 100 proceeds to storage step 108, including storing the auxiliary information and its associated timestamp information in a log file or other logical data structure, in such a manner that the structure is associated with a corresponding program. Corresponding program content may also be stored in the storage step 108, or alternatively, previously stored program content may be associated with the auxiliary information stored during storage step 108. The storage step 108 may be accomplished using, for example, a hard disk or other device using non-volatile storage technology, or a plurality of hard disks, a recordable optical disk, or other storage devices coupled, for example, in a server configuration. Of course, it should be appreciated that non-volatile storage is not required, and the illustrated method 100 may be accomplished using volatile storage technology (e.g., random access memory (RAM)) or the like, or using other storage technologies suitable for the purpose known to a person of ordinary skill in the art. One of the features of the present invention is that the log file or other logical data structure may occupy a small amount of storage, permitting the present invention to be implemented at a reasonable cost in contexts in which storage resources are scarce.

The illustrated method then proceeds to determination step 110, in which the auxiliary information and other program information and content may be analyzed to determine candidate portions for customized display of auxiliary information. Customized display of auxiliary information may be desired when a program or a portion of a program includes auxiliary information that is displayed in an unsatisfactory manner. For example, caption text may be displayed for a duration shorter than desired, impeding user comprehension. For another example, caption text may be displayed in a small text size, unreadable font, small number of lines on-screen, or may otherwise be limited to a particular area of the screen. For another example, the caption text as well as program events may occur too quickly for satisfactory comprehension of the events and the caption text.

In each of the above-described examples, the determination step 110 may include analysis of each unit or group of auxiliary information as well as precedent, concurrent, and subsequent program content to determine whether display of the auxiliary information can or should be altered according to user preferences. For example, the determination step 110 may include adjusting the display times of the closed caption, including determination of new start and end times for each burst of dialogue, or "time spreading" as described below with reference to FIG. 2. For another example, the determination step 110 may include determination of an expanded area of the screen in which to display additional lines of caption text during portions of the program in which large amounts of dialogue occur, as described below with reference to FIG. 3. For another example, the determination step 110 may include determination of an altered playback rate for portions of the program in which events and dialogue occur too quickly for comprehension, as described below with reference to FIG. 4. Of course, the present invention is not limited to the embodiments described with reference to FIGS. 2-4, for example combinations or variations of these embodiments may be implemented without departing from the spirit or scope of the present invention.

The determination step 110, as well as the acquisition step 104, association step 106, and storage step 108, may occur "offline," or at a time when the program content and auxiliary information is not currently being displayed, for example during or after recording of a program to be viewed at a later time (i.e., "time-shifting"). Alternatively, the determination step 110, along with the acquisition step 104, association step 106, and storage step 108, may occur "online," or substantially simultaneously with display of the program content and auxiliary information; for example analysis and determination may take place during broadcast of the program and customized auxiliary information may be displayed with a slight delay which is not readily apparent to the user, similar to the display from a PVR type device in which the program is being stored and displayed.

The illustrated method 100 then proceeds to the display step 112, in which auxiliary information and program content is displayed including customized auxiliary information as determined in the determining step 110. Those portions of the program identified in the determining step 110 as candidate portions for customization may include display of auxiliary information in a customized manner, according to user desires. For example, large-size text may be displayed during musical passages of a program. Based on user preferences or selections, some candidate portions and/or the remaining content of the program may include unaltered display of auxiliary information. User preferences or selections may be transmitted or received at any time during the illustrated method 100. Alternatively, in the absence of user selections, default preferences may be utilized in the determining step 110 and reflected in the display step 112.

Following the display step 112, the illustrated method 100 ends at step 114. Thereafter, at some future time, the method 100 may begin again in accordance with manually or automatically programmed events or user input.

An exemplary method of customizing display of auxiliary information will now be described with reference to FIG. 2.

Figure 2:
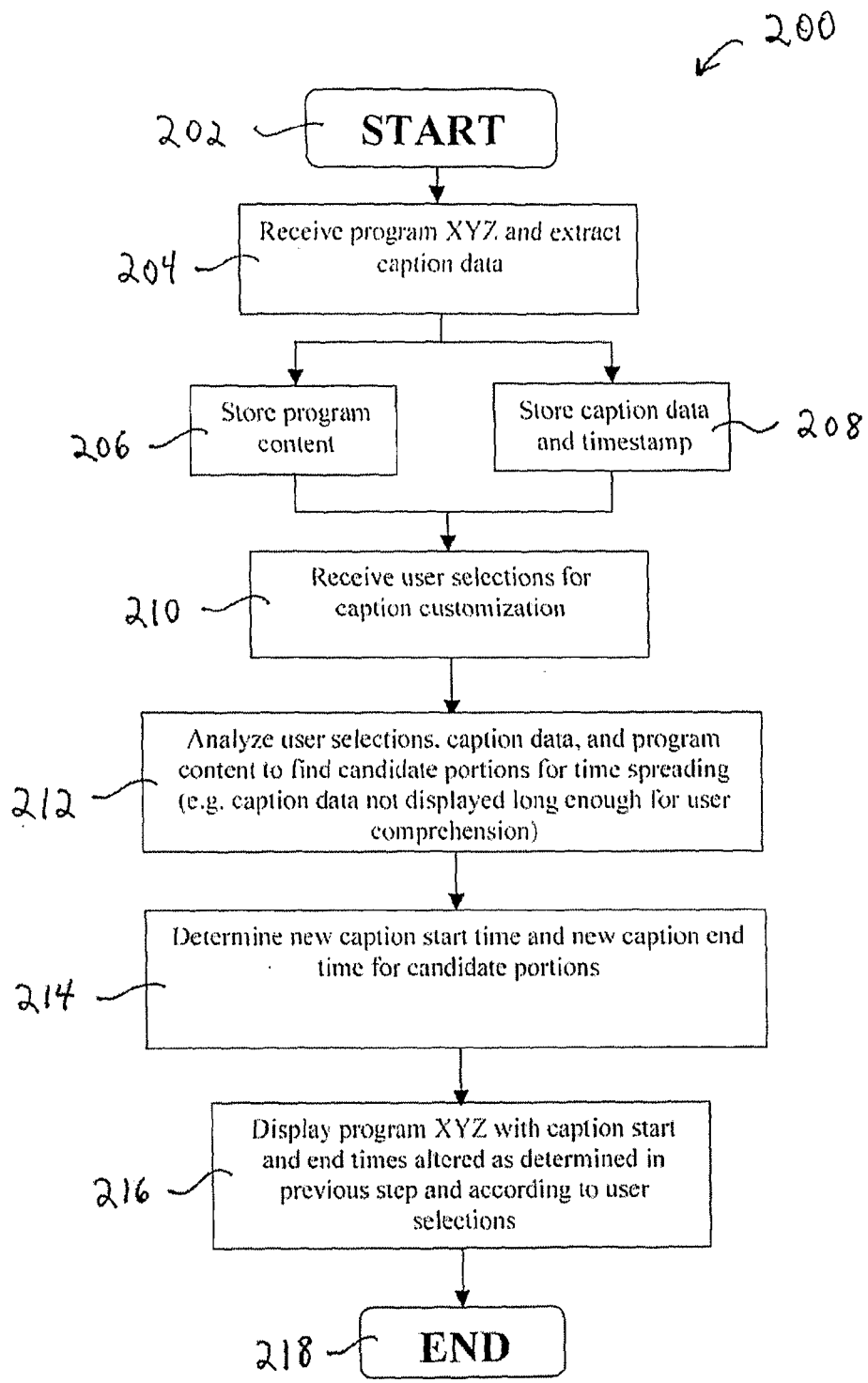
FIG. 2 is a simplified flow diagram illustrating an exemplary method of "time spreading" auxiliary information in accordance with an embodiment of the present invention.

FIG. 2 shows a simplified flow diagram illustrating an exemplary method of "time spreading" auxiliary information generally designated 200. The illustrated method 200 includes a reception and extraction step 204, a program storage step 206, an auxiliary information storage step 208, a user selection step 210, an analysis step 212, a determination step 214, and a display step 216.

The illustrated method 200 begins at step 202 and proceeds to the reception and extraction step 204, in which program signals are received containing embedded auxiliary information, such as closed caption text associated with a television program transmitted via the program signals. The auxiliary information is extracted from the program signals as described above with reference to FIG. 1 and the accompanying text describing acquisition step 104.

The illustrated method 200 then proceeds to program storage step 206 and auxiliary information storage step 208. Storage steps 206, 208 may proceed substantially simultaneously or in any order. In the program storage step 206, program content including video and/or audio portions is decoded and/or extracted from the program signals and stored in a convenient storage medium such as, for example, a hard disk or other non-volatile storage device. In the auxiliary information storage step 208, auxiliary information including, for example, closed captioning information, is decoded and/or extracted from the program signals and stored in the same or an associated storage medium, for example the same or another hard disk in a server array or other non-volatile storage device. The storage steps 206, 208 otherwise proceed as described above with reference to FIG. 1 and the accompanying text describing the association step 106 and the storage step 108.

The illustrated method 200 includes user selection step 210, in which selections or preferences are received from a user. For "time spreading," the time interval during which a unit or group of auxiliary information (e.g. caption text) is displayed may be expanded, for example, to increase the time allowed for a user to read and comprehend the caption text. In this example, the start time T1 of a given burst of dialogue may be moved up, or changed to an earlier time by an amount S, known as the "lead time." Likewise, the end time T2 of a given burst of dialogue may be moved back, or changed to a later time by an amount L, known as the "lag time." Exemplary user preferences may include a threshold amount of dialogue which may trigger "time spreading," default values for lead time S and lag time L, and/or a maximum reading rate selected by a user which may be used to determine the other "time spreading" parameters. Of course, it should be appreciated that a user may be able to choose to decrease the amount of time for display of auxiliary information in a similar manner in accordance with the present invention.

A user may select from a number of predefined user choices related to "time spreading" customization of auxiliary information. Alternatively, a user may input specific parameters related to "time spreading," for example a user may input a maximum lead time S or maximum lag time L.

The user may transmit selections or preferences from a local or remote location using a variety of input devices including handheld remote controllers, keyboards, "mice," gamepads, joysticks, personal digital assistants (PDAs), cellular telephones, tablet computers, and other user input devices known in the art. User preferences or selections may be transmitted or received at any time during the illustrated method 200. In the absence of explicit user selections, default user preferences are implied in user selection step 210.

The illustrated method 200 then proceeds to the analysis step 212, in which the program content, auxiliary information, and user selections are analyzed to determine which, if any, portions of the program are candidates for "time spreading" customization of the auxiliary information display. The analysis step 212 includes separation of the auxiliary information into individual units or groups, for example corresponding to scenes or bursts of dialogue in the video and/or audio portions of the program content. Each individual unit or group of auxiliary information is analyzed to determine whether or not "time spreading" is appropriate in light of received user selections, and if so, what alterations may be made to the starting and ending times used to display the auxiliary information.

For example, for each unit or group of auxiliary information an original start time T1, original end time T2, and amount of auxiliary information (e.g. caption text) to be displayed may be determined. Where the amount of auxiliary information to be displayed per unit time exceeds a threshold determined in the user selection step 210, a lead time S and lag time L may be computed. The lead time S and lag time L may be determined according to the maximum time available for display, for example S and L may be set to maximize the amount of time the unit or group of auxiliary information is displayed without overlapping adjacent scenes or bursts of dialogue.

Alternatively, the lead time S and lag time L may be determined in accordance with threshold information determined in the user selection step 210, regardless of overlap. When "time spreading" is triggered, the duration that auxiliary information is displayed may be altered from the time period (T2−T1) to the new time period (T2+L−(T1−S)).

Following the analysis step 212, the illustrated method 200 proceeds to the determination step 214, in which the "time spreading" parameters determined in the analysis step 212 are used to compute a new start time (T1−S) and a new end time (T2+L) for each unit or group of auxiliary information meeting the threshold determined in determining step 212. Of course, one or both of the new start time and new end time may remain unaltered from the original start and/or end times regardless of threshold where constraints in the program content, user selections, or other factors prevent or counsel against alteration, for example to prevent spoiling an element of suspense. Of course, a user may be able to increase or decrease the amount of time particular units or groups of auxiliary information are displayed in accordance with the present invention. It should be appreciated by a person of ordinary skill in the art that effective implementation of "time spreading" may require prior interaction or orientation by users, broadcasters, and/or others, for example default values of lead time S and lag time L may change according to user selections and programming to which "time spreading" may be applied.

The illustrated method 200 then proceeds to the display step 216, in which customized auxiliary information and program content is displayed including "time spreading" of individual units or groups of auxiliary information as determined in the analysis step 212 and the determining step 214. It should be appreciated that user selections may occur before, during, and/or after display of the program, which may alter the customized display of auxiliary information for current or succeeding users of program content. In this way, the present invention may smooth out the presentation of auxiliary information (e.g. caption text) corresponding to particular passages or bursts of dialogue, while substantially maintaining the overall pace of program events.

Following the display step 216, the illustrated method 200 ends at step 218. Thereafter, at some future time, the method 200 may begin again in accordance with manually or automatically programmed events or user input.

Figure 3:
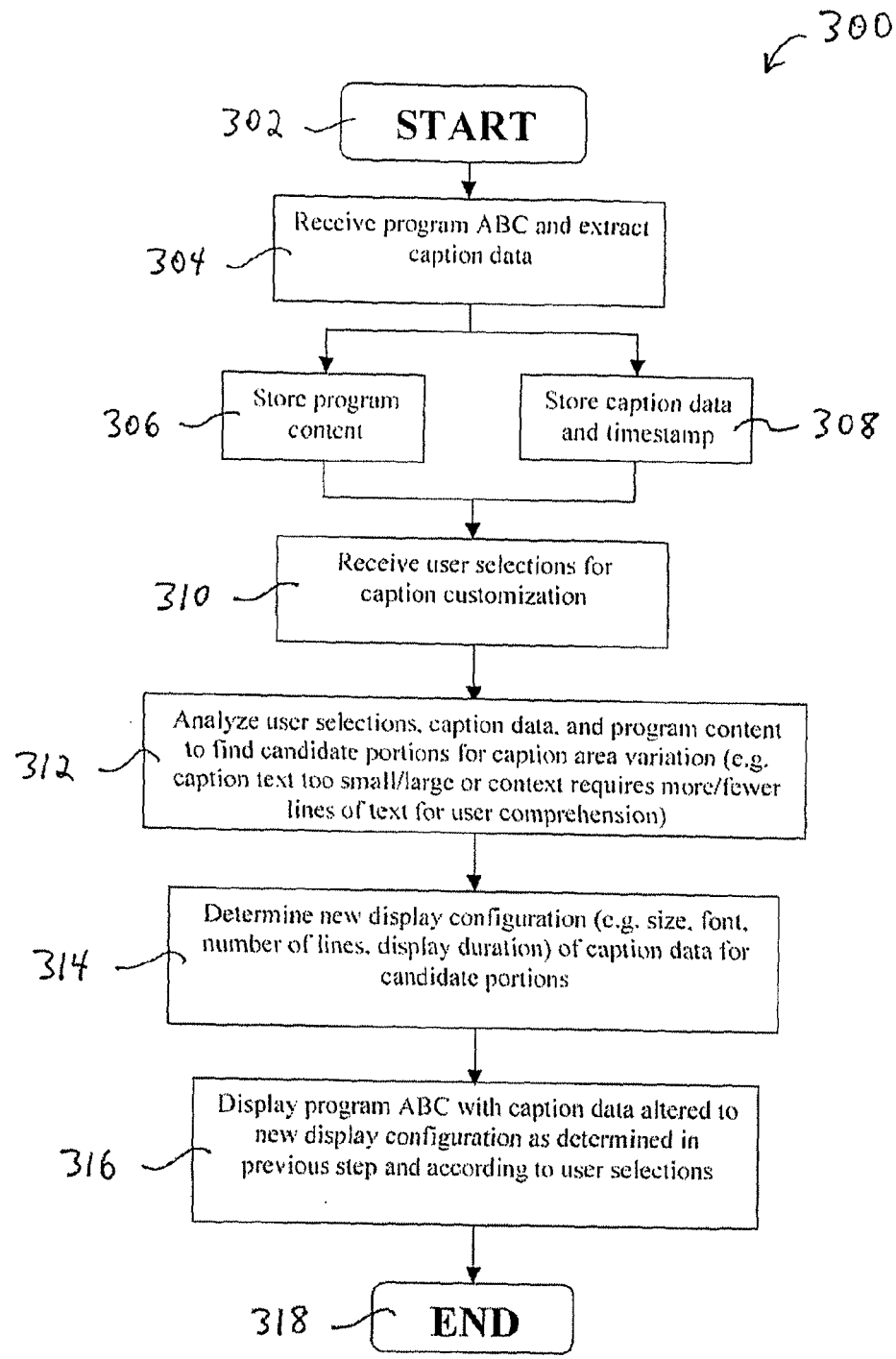
FIG. 3 is a simplified flow diagram illustrating an exemplary method of "area variation" of auxiliary information in accordance with an embodiment of the present invention.

Another exemplary method of customizing display of auxiliary information will now be described with reference to FIG. 3. FIG. 3 shows a simplified flow diagram illustrating an exemplary method of "area variation" for customized display of auxiliary information generally designated 300. The illustrated method 300 includes a reception and extraction step 304, a program storage step 306, an auxiliary information storage step 308, a user selection step 310, an analysis step 312, a determination step 314, and a display step 316.

The illustrated method 300 begins at 302 and proceeds to the reception and extraction step 304, in which program signals are received containing embedded auxiliary information, such as closed caption text associated with a television program transmitted via the program signals. The method 300, including reception and extraction step 304, program storage step 306, and auxiliary information storage step 308, proceeds in a manner identical to that described above with reference to FIG. 2 and the accompanying text describing reception and extraction step 204, program storage step 206, and auxiliary information storage step 208, respectively.

The illustrated method 300 includes user selection step 310, in which selections or preferences are received from a user. For "area variation," the on-screen area in which a unit or group of auxiliary information (e.g. caption text) is displayed may be expanded, for example, to accommodate larger size text, different fonts and/or text styles, increased lines of caption text, and/or extended duration of display. Exemplary user preferences may include a threshold amount of dialogue which may trigger "area variation," default values for nominal and expanded areas allocated for display of auxiliary information, and/or a maximum reading rate selected by a user which may be used to determine other "area variation" parameters.

A user may select from a number of predefined user choices related to "area variation" in display of auxiliary information. Alternatively, a user may input specific parameters related to "area variation," for example a user may input a maximum number of lines of caption text or a minimum text size.

Similar to previously-described embodiments, a user may transmit selections or preferences from a local or remote location using a variety of input devices. In the absence of explicit user selections, default user preferences are implied in user selection step 310.

The illustrated method 300 then proceeds to the analysis step 312, in which the program content, auxiliary information, and user selections are analyzed to determine which, if any, portions of the program are candidates for "area variation" of the auxiliary information display. The analysis step 312 includes separation of the auxiliary information into individual units or groups, for example corresponding to scenes or bursts of dialogue in the video and/or audio portions of the program content. Each individual unit or group of auxiliary information is analyzed to determine whether or not "area variation" is appropriate in light of received user selections, and if so, what alterations may be made to the amount of on-screen area devoted to displaying auxiliary information.

For example, for each unit or group of auxiliary information an original caption display area may be determined, as well as an altered display area required to display the caption text utilizing the user-selected "area variation" parameters (e.g. text size, font, number of lines, display duration). Where the altered display area exceeds a maximum, for example, determined by the broadcaster or by the user in the user selection step 310, substitute "area variation" parameters may be determined using program content to most closely match user preferences without overlapping adjacent scenes or bursts of dialogue. Alternatively, user-selected "area variation" parameters determined in the user selection step 310 may be used, regardless of overlap.

Following the analysis step 312, the illustrated method 300 proceeds to the determination step 314, in which the "area variation" parameters determined in the analysis step 312 are used to define a new display configuration for each unit or group of auxiliary information for which "area variation" was deemed appropriate. Of course, one or more "area variation" parameters may remain unaltered from their original values where constraints in the program content, user selections, or other factors prevent or counsel against alteration, for example to prevent obfuscation of critical video content. It should be appreciated by a person of ordinary skill in the art that effective implementation of "area variation" may require prior interaction or orientation by users, broadcasters, and/or others, for example default values of text size and display duration may change according to user selections and programming to which "area variation" may be applied.

The illustrated method 300 then proceeds to the display step 316, in which customized auxiliary information and program content is displayed including "area variation" of individual units or groups of auxiliary information as determined in the analysis step 312 and the determining step 314. "Area variation" thus may, for example, permit a larger amount of text to be displayed on-screen simultaneously, allow users more time to digest complex textual information, and/or permit users to look away from the screen momentarily without missing dialogue. Of course, "area variation" may include decreasing the area permitted for display of auxiliary information in a manner similar to that described above. It should be appreciated that user selections may occur before, during, and/or after display of the program, which may alter the customized display of auxiliary information for current or succeeding users of program content. In this way, the present invention may display larger-size text or different fonts for vision-impaired users, more lines of text for users preferring more context, and/or extended duration display of caption text with or without "roll-up captions," while substantially maintaining the overall pace of program events.

Following the display step 316, the illustrated method 300 ends at step 318. Thereafter, at some future time, the method 300 may begin again in accordance with manually or automatically programmed events or user input.

Figure 4:
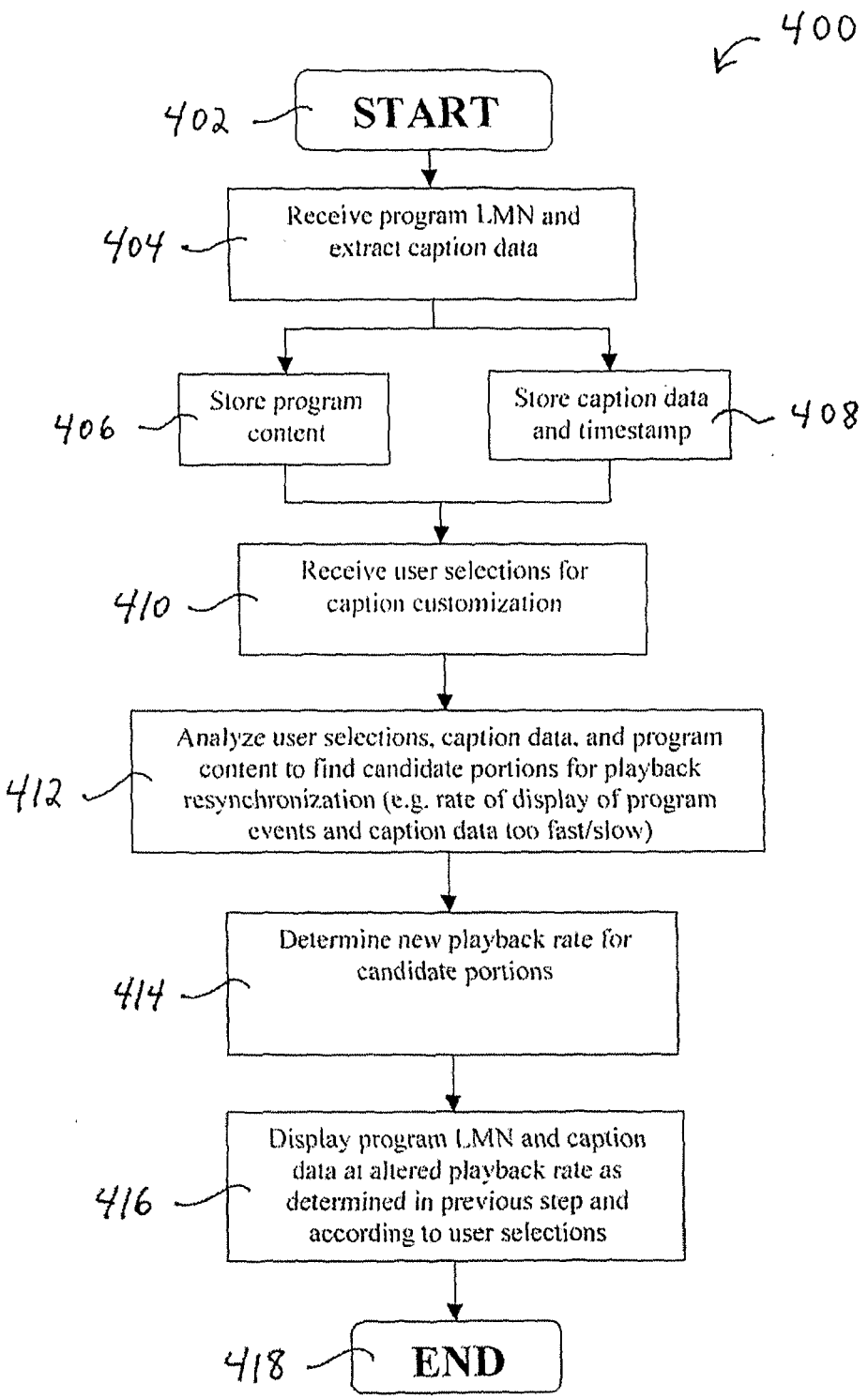
FIG. 4 is a simplified flow diagram illustrating an exemplary method of "playback resynchronization" in accordance with an embodiment of the present invention.

Another exemplary method of customizing display of auxiliary information will now be described with reference to FIG. 4. FIG. 4 shows a simplified flow diagram illustrating an exemplary method of "playback resynchronization" for customized display of auxiliary information generally designated 400. The illustrated method 400 includes a reception and extraction step 404, a program storage step 406, an auxiliary information storage step 408, a user selection step 410, an analysis step 412, a determination step 414, and a display step 416.

The illustrated method 400 begins at 402 and proceeds to the reception and extraction step 404, in which program signals are received containing embedded auxiliary information, such as closed caption text associated with a television program transmitted via the program signals. The method 400, including reception and extraction step 404, program storage step 406, and auxiliary information storage step 408, proceeds in a manner identical to that described above with reference to FIG. 2 and the accompanying text describing reception and extraction step 204, program storage step 206, and auxiliary information storage step 208.

The illustrated method 400 includes user selection step 410, in which selections or preferences are received from a user. For "playback resynchronization," the rate at which auxiliary information and program events are displayed may be altered, for example, to slightly slow the presentation of closed captioning. Exemplary user preferences may include a threshold amount of dialogue which may trigger "playback resynchronization," default values for playback rate, and/or a maximum reading rate selected by a user which may be used to determine other "playback resynchronization" parameters.

A user may select from a number of predefined user choices related to "playback resynchronization" of auxiliary information. Alternatively, a user may input specific parameters related to "playback resynchronization," for example a user may input a maximum number of characters or words displayed per unit time.

Similar to previously-described embodiments, a user may transmit selections or preferences from a local or remote location using a variety of input devices. In the absence of explicit user selections, default user preferences are implied in user selection step 410. For "playback resynchronization," it is anticipated that users may desire to speed up or slow down playback of program content and auxiliary information while viewing the program. One embodiment of the present invention includes a user input device with "VCR-like" transport keys for fine control of auxiliary information playback, such as fast-forward, reverse, play, pause, slow advance, slow reverse, etc.

The illustrated method 400 then proceeds to the analysis step 412, in which the program content, auxiliary information, and user selections are analyzed to determine which, if any, portions of the program are candidates for "playback resynchronization." The analysis step 412 includes separation of the auxiliary information into individual units or groups, for example corresponding to scenes or bursts of dialogue in the video and/or audio portions of the program content. Each individual unit or group of auxiliary information is analyzed to determine whether or not "playback resynchronization" is appropriate in light of received user selections, and if so, what alterations may be made to the playback rate.

For example, for each unit or group of auxiliary information an original caption display rate may be determined, as well as an altered caption display rate required to display the caption text utilizing the user-selected "playback resynchronization" parameters (e.g. maximum number of characters or words per unit time). Where the original display rate exceeds a maximum, for example, determined by the user in the user selection step 410, an altered display rate may be computed using program content to most closely match user preferences without unduly disrupting scenes or dialogue. Alternatively, user-selected "playback resynchronization" parameters determined in the user selection step 410 may be used, regardless of disruption.

Following the analysis step 412, the illustrated method 400 proceeds to the determination step 414, in which the "playback resynchronization" parameters determined in the analysis step 412 are used to define a new display playback rate for each unit or group of auxiliary information for which "playback resynchronization" was deemed appropriate. Of course, one or more "playback resynchronization" parameters may remain unaltered from their original values where constraints in the program content, user selections, or other factors prevent or counsel against alteration, for example to prevent undue distortion of accompanying audio content. It should be appreciated by a person of ordinary skill in the art that effective implementation of "playback resynchronization" may require prior interaction or orientation by users, broadcasters, and/or others, for example default values for playback rate may change according to user selections and programming to which "playback resynchronization" may be applied.

The illustrated method 400 then proceeds to the display step 416, in which customized auxiliary information and program content is displayed including "playback resynchronization" of individual units or groups of auxiliary information as determined in the analysis step 412 and the determining step 414. It should be appreciated that user selections may occur before, during, and/or after display of the program, which may alter the customized display of auxiliary information for current or succeeding users of program content. In this way, the present invention may display auxiliary information at a reduced playback rate for slow-reading users or at an increased rate for fast-reading users, while substantially maintaining the overall pace of program events.

Following the display step 416, the illustrated method 400 ends at step 418. Thereafter, at some future time, the method 400 may begin again in accordance with manually or automatically programmed events or user input.

Figure 5:
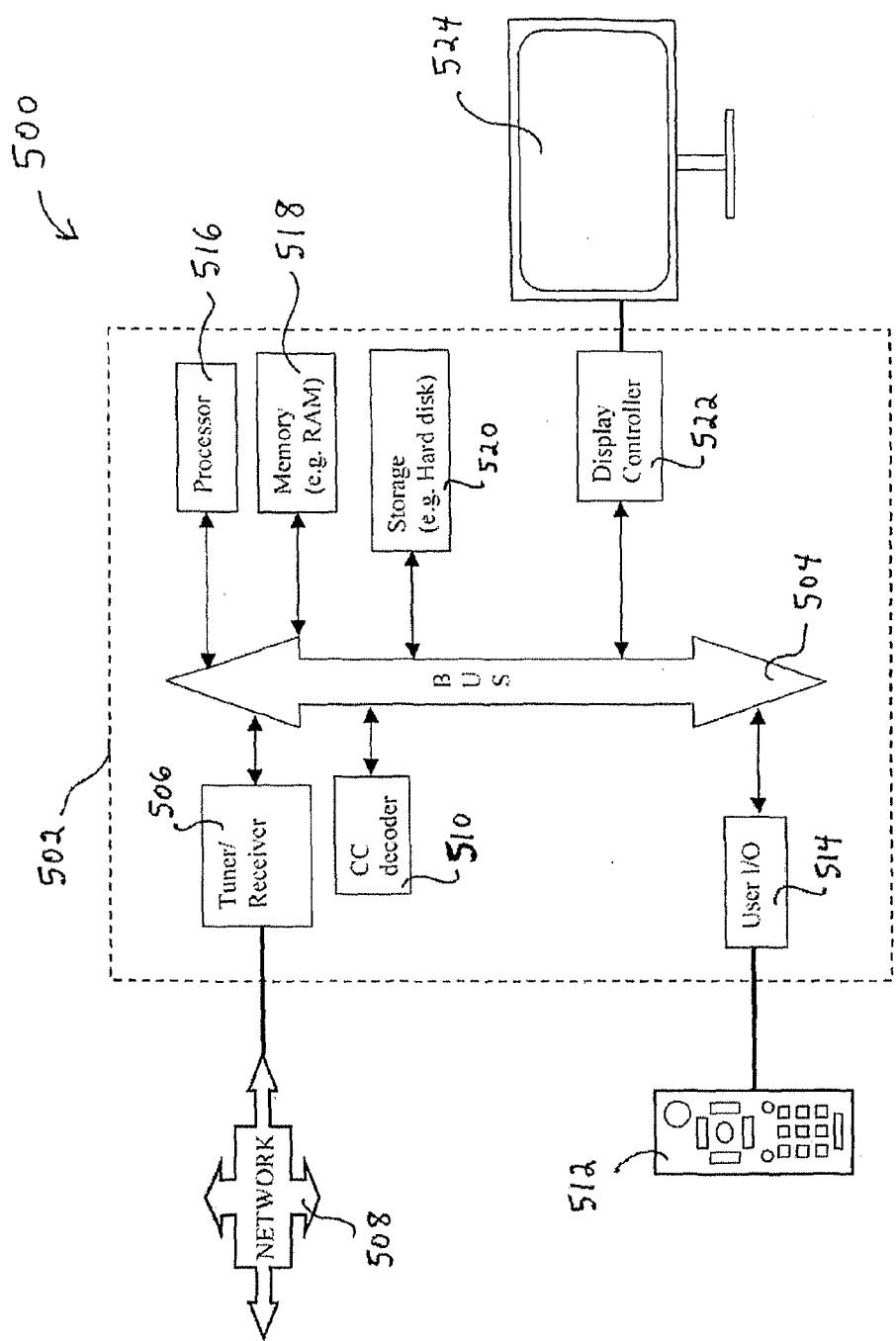
FIG. 5 is a simplified pictorial block diagram illustrating an exemplary television reception system for customized display of auxiliary information in accordance with another embodiment of the present invention.

A television reception system for customized display of auxiliary information in accordance with an aspect of the present invention is illustrated in FIG. 5. The television reception system 500 includes television signal source 508, a user input device 512, a reception and processing device 502, and an audio/video display device 524. The television signal source 508 may include, for example, one or more of the following: a conventional antenna configured to receive terrestrial or over-the-air (OTA) television signals, a satellite transceiver configured to receive television signals transmitted or reflected from airborne or spaceborne devices, a transmission cable configured to transfer cable television signals, and a network connection configured to receive and transfer information over a public or private network; for example data transmitted using multiple different protocols over the Internet. The television signal source 508 may include amplifiers, pre-amplifiers, or other components for television reception as is well known in the art. The television signal source 508 may be coupled to the reception and processing device 502 via coaxial cable, fiber optic cable, ribbon cable, high speed data transmission line, or other signal transmission medium known in the art.

The illustrated reception and processing device 502 includes a tuner/receiver 506, an auxiliary information decoder 510 (e.g. a closed captioning decoder), a processor 516, random access memory (RAM) 518, hard disk storage 520, at least one user input/output device 514, a bus 504 including, for example, a data bus, and a display controller 522 coupled to an audio/video display device 524. In various embodiments, the reception and processing device 502 may alternatively be coupled to other recording, mass storage, playback, display, exhibition, or networking devices as are well known in the art.

The reception and processing unit 502 includes software and/or firmware instructions that implement an auxiliary information display scheme in accordance with the present invention. For example, the reception and processing unit 502 may be configured to implement the method 100 described above with reference to FIG. 1. Alternatively, the processing unit 502 may be configured to implement one or more of the methods 200, 300, 400 described above with reference to FIGS. 2-4. In operation, a user may utilize reception and processing unit 502 in conjunction with television signal source 508, user input device 512, and audio/video display device 524 to store and display, in a customized manner, auxiliary information (e.g. closed captioning) associated with program content.

While the invention has been described in detail in connection with the preferred embodiments known at the present time, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description, but is only limited by the scope of the appended claims.

The invention claimed is:

1. A method for processing auxiliary information associated with a video program, comprising:
receiving and storing program signals representative of the video program;
extracting, from the received program signals, auxiliary information associated with the video program and storing said extracted auxiliary information, portions of the auxiliary information having respective display timing relationships with the video program;
processing the stored program signals to provide a first output signal in response to user selection of the video program;
processing the auxiliary information to provide a second output signal in response to user request to display the auxiliary information;
determining whether a portion of the auxiliary information has a predetermined display timing relationship with the video program; and
adjusting display duration of the portion of the auxiliary information on the video program on a portion by portion basis in response to the determining step, and in response combining the first output signal and the second output signal to produce a combined output signal representative of the video program and the auxiliary information superimposed thereon for display.

2. The method as in claim 1, wherein the video program comprises a television program and the auxiliary information includes closed captioning information.

3. The method as in claim 2, wherein the stored auxiliary information includes one or more time stamps indicative of the respective display timing relationship between the program signal and the program signal.

4. The method as in claim 1, wherein the determining step includes determining an amount of auxiliary information to be displayed per unit of time during a particular time interval of the video program.

5. The method as in claim 4, wherein the predetermined timing relationship corresponds to the amount of auxiliary information to be displayed per unit of time exceeding a threshold level.

6. The method as in claim 5, wherein the threshold level is selectable by the user.

7. The method as in claim 1, wherein the determining step is performed in response to the steps of receiving and storing the program signal, and receiving and storing auxiliary information.

8. The method as in claim 1, wherein the adjusting step comprises controlling the second output signal to change one or more of a starting time and an ending time for at least one of the portions of the auxiliary information.

9. The method as in claim 8, wherein the combining step comprises enlarging an area allocated for display of the auxiliary information.

10. The method as in claim 1, wherein the combining step comprises reducing a rate of playback of the combined output signal for at least one of the portions of the auxiliary information.

11. An apparatus, comprising:
a signal source;
a processing unit, coupled to the signal source, for receiving a video program signal and extracting, from the received video program signal, auxiliary information associated with the video program signal, respective portions of the auxiliary information having respective display time relationship with the video program signal;
user input/output device coupled to receive an input from a user;
a storage device, coupled to the processing unit, for storing the received video program signal and auxiliary information; and
a control unit, coupled to the processing unit, user input/output device and storage device, the control unit determining whether a portion of the auxiliary information has a predetermined display time relationship with the video program signal, and adjusting the display time of the portion of the auxiliary information on the video program on a portion by portion basis in response to the determination to produce a combined signal representative of the video program signal and the auxiliary information superimposed thereon;
wherein the control unit is further configured to change one or more of a starting time and an ending time for display of at least one of the portions of the auxiliary information.

12. A system as in claim 11, wherein the control unit is configured to enlarge an area allocated for display of the auxiliary information on the at least one program display device.

13. A system as in claim 11, wherein the control unit is configured to reduce a rate of playback of the combined output signal for at least one of the portions of the auxiliary information.

14. A system as in claim 11, wherein the signal source includes one or more of an over-the-air antenna, a satellite transceiver, a cable television cable, and a network connection.

* * * * *